(12) United States Patent
Swanburg (10) Patent No.: US 9,210,115 B2
(45) Date of Patent: *Dec. 8, 2015

(54) INTERACTIVE PERSONAL INFORMATION MANAGEMENT SYSTEM

(71) Applicant: AT&T Mobility II LLC, Atlanta, GA (US)

(72) Inventor: Scott Allen Swanburg, Duluth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,299

(22) Filed: Jun. 24, 2014

(65) Prior Publication Data

US 2014/0308927 A1  Oct. 16, 2014

Related U.S. Application Data

(63) Continuation of application No. 11/514,167, filed on Sep. 1, 2006, now Pat. No. 8,768,332.

(51) Int. Cl.
| | |
|---|---|
| G06F 17/00 | (2006.01) |
| H04L 12/58 | (2006.01) |
| G06F 17/30 | (2006.01) |
| G06Q 10/10 | (2012.01) |
| H04W 4/18 | (2009.01) |

(52) U.S. Cl.
CPC .......... *H04L 51/30* (2013.01); *G06F 17/30575* (2013.01); *G06Q 10/10* (2013.01); *H04W 4/18* (2013.01)

(58) Field of Classification Search
CPC ...................................................... G06F 17/00
USPC .......................................... 455/420; 707/951
See application file for complete search history.

(56) References Cited

U.S. PATENT DOCUMENTS

| | | | |
|---|---|---|---|
| 7,248,872 B2* | 7/2007 | Bassett et al. ................. | 455/433 |
| 7,660,904 B2 | 2/2010 | Qureshi et al. | |
| 7,668,775 B2 | 2/2010 | Lu | |
| 7,668,900 B2* | 2/2010 | Fishman et al. .............. | 709/203 |
| 8,060,539 B2 | 11/2011 | Adams et al. | |
| 8,417,782 B2* | 4/2013 | Tendjoukian et al. ........ | 709/206 |
| 2003/0069874 A1 | 4/2003 | Hertzog | |
| 2003/0130882 A1 | 7/2003 | Shuttleworth et al. | |
| 2005/0002510 A1 | 1/2005 | Elsey et al. | |
| 2005/0068980 A1 | 3/2005 | Matthew et al. | |
| 2006/0025123 A1 | 2/2006 | Majmundar et al. | |
| 2006/0041746 A1 | 2/2006 | Kirkup et al. | |
| 2006/0068814 A1 | 3/2006 | Cheng et al. | |

(Continued)

OTHER PUBLICATIONS

U.S. Office Action mailed on Sep. 4, 2008 in U.S. Appl. No. 11/514,167.

(Continued)

*Primary Examiner* — Vladimir Magloire
*Assistant Examiner* — Frank Donado
(74) *Attorney, Agent, or Firm* — Hartman & Citrin LLC (57) ABSTRACT

An interactive personal information management system is disclosed. The system permits a user to communicate updated information to other users of a personal information management system. The system notifies the other users of the change and automatically updates the other users' personal information management system to reflect the changed information.

20 Claims, 6 Drawing Sheets

(56) References Cited

U.S. PATENT DOCUMENTS

| | | |
|---|---|---|
| 2006/0101447 A1* | 5/2006 | Koch ........................ 717/168 |
| 2006/0218224 A1 | 9/2006 | Agrawal et al. |
| 2006/0265262 A1 | 11/2006 | Kamdar et al. |
| 2007/0198745 A1 | 8/2007 | Fornari |
| 2007/0245026 A1 | 10/2007 | Martin et al. |
| 2007/0280459 A1 | 12/2007 | Yee et al. |
| 2007/0288658 A1 | 12/2007 | Lam et al. |
| 2009/0013380 A1 | 1/2009 | Chandrasiri et al. |
| 2009/0023435 A1 | 1/2009 | Kuivalainen |
| 2010/0274614 A1 | 10/2010 | Fraley et al. |
| 2011/0028131 A1 | 2/2011 | May |

OTHER PUBLICATIONS

U.S. Office Action mailed on Mar. 3, 2009 in U.S. Appl. No. 11/514,167.
U.S. Advisory Action mailed on May 4, 2009 in U.S. Appl. No. 11/514,167.
U.S. Office Action mailed on Aug. 18, 2009 in U.S. Appl. No. 11/514,167.
U.S. Office Action mailed on Mar. 5, 2010 in U.S. Appl. No. 11/514,167.
U.S. Office Action mailed on Sep. 1, 2010 in U.S. Appl. No. 11/514,167.
U.S. Office Action mailed on Feb. 18, 2011 in U.S. Appl. No. 11/514,167.
U.S. Office Action mailed on Apr. 25, 2011 in U.S. Appl. No. 11/514,167.
U.S. Office Action mailed on Sep. 30, 2011 in U.S. Appl. No. 11/514,167.
U.S. Office Action mailed on Apr. 18, 2012 in U.S. Appl. No. 11/514,167.
U.S. Office Action mailed on Aug. 10, 2012 in U.S. Appl. No. 11/514,167.
U.S. Office Action mailed on Dec. 28, 2012 in U.S. Appl. No. 11/514,167.
U.S. Office Action mailed on Jun. 25, 2013 in U.S. Appl. No. 11/514,167.
U.S. Notice of Allowance mailed on Jan. 23, 2014 in U.S. Appl. No. 11/514,167.

* cited by examiner

INTERACTIVE PERSONAL INFORMATION MANAGEMENT SYSTEM

CROSS-REFERENCE TO RELATED APPLICATION

This application is a continuation of and claims priority to U.S. patent application Ser. No. 11/514,167, entitled "Interactive Personal Information Management System," filed Sep. 1, 2006, now U.S. Pat. No. 8,768,332, which is incorporated herein by reference in its entirety.

BACKGROUND

1. Technical Field

The present invention relates to personal information management systems. More particularly, the present invention relates to interactive personal information management systems.

2. Background

People today have busy schedules. A businessperson may have an entire day or week carefully planned out with meetings, interviews, and the like. Even grade school children now have less free time, between school in the daytime and extra-curricular activities (such as sports or music lessons) in the late afternoon and early evening.

To account for the more hectic modern lifestyle, several types of devices exist to help people manage their schedules. Cellular telephones allow immediate communication, useful to learn of any changes in plans. Personal digital assistants (PDAs) enable people to manage their schedules and to update the schedules as needed. Recently, the functions offered by these types of devices have begun to merge. Cellular phones now have calendar and contact applications. Similarly, PDAs now offer mobile telephony and Internet access.

Despite these advances, it remains difficult to keep up to date on important changes. For example, a professor may use electronic mail (E-mail) to send a syllabus listing assignment due dates to students at the beginning of the semester. Later in the semester, the syllabus may need to change to reflect circumstances unforeseen at the beginning of the semester (the professor may be going through the material more slowly or quickly than planned). As a result, the professor may decide to extend an assignment deadline.

Presently, the professor has several ways to communicate the extended assignment deadline to students. The professor could send an E-mail to all students notifying them of the change. However, there is no guarantee the students will receive the message. Nor can the professor be certain the students will read the message even if they have received the message. Finally, the professor has no way to ensure the students will enter the changed deadline into their own calendar (or other personal management) program. As a result, some students will not know of the changed deadline.

The professor could also make an announcement of the changed deadline in class. However, this solution has several of the same problems as the E-mail solution. Not all students may attend the class; these students would have to rely on others to receive news of the extended deadline. In addition, students may write the date down incorrectly; or, if they wrote the date down on paper, they may lose the paper they wrote the date on.

In short, despite advances in technology, people today still do not have an effective way of knowing whether their schedule, or other important information, has changed. What is needed is a way for one individual to automatically inform or update information in the schedules of others.

SUMMARY

The current techniques for updating information on personal information management devices are inefficient and inconvenient. Present techniques require a user to receive word of changes or new items and then enter the information into the device. However, this requires that a user first receive word of the new information and then manually enter the information into the device correctly. If the user does not receive the new information, does not enter the information into his device, or does not enter the information correctly, the user will not be able to make use of the new information. This could lead the user to miss an important event, such as a business meeting. The present invention solves this problem by providing a way to automatically propagate new information from one user to another.

In one exemplary embodiment of the present invention, a device is disclosed. The device includes a personal information management component. The personal information management component stores objects comprising information useful to a user of the device. An update component receives updated objects from a remote user and updates the corresponding object in the personal information management component. The device could be a cellular telephone, PDA, or similar device.

In another exemplary embodiment of the present invention, a device is disclosed. The device includes a personal information management component. The personal information management component stores objects comprising information useful to a user of the device. An update component receives updated objects from a remote user and updates the corresponding objects in the personal information management component. The device also includes a transmission component, which stores a set of remote users and can transmit an updated object to a subset of those remote users.

DETAILED DESCRIPTION

The present invention provides for personal information management programs that can be updated dynamically by remote users whenever the remote users need to change information stored in a user's personal information management applications. In the examples and embodiments described herein, the personal information management system will refer to calendar applications stored in cellular telephones. Further, the invention allows for the automated delivery of a return receipt by which the sending party is automatically notified when a message or event has been viewed, accepted, or rejected. However, the particular purpose of the personal information management application and the device in which the application is stored are not limiting aspects of the present invention. For example, the personal information management application could be an address book. Similarly, the cellular telephone could be a personal digital assistant (PDA) or laptop computer.

Figure 1:
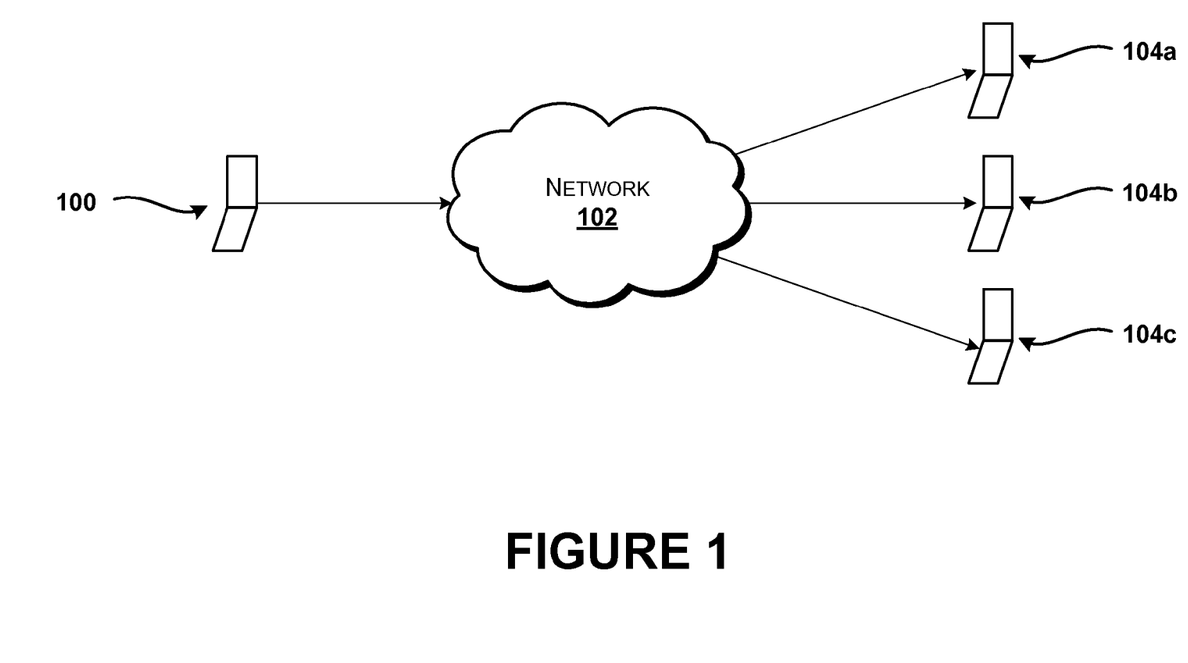
FIG. 1 shows a device according to an exemplary embodiment of the present invention communicating with other devices across a network.

A first exemplary embodiment of the present invention is shown in FIG. 1. FIG. 1 shows a device 100 communicating with other remote devices 104a, 104b, 104c across a network 102. If a user of the device 100 would like to update information stored in the remote devices 104a, 104b, 104c, the user may use the present invention to automatically communicate the updated information across the network 102 to one or more of the remote devices 104a, 104b, 104c. The network 102 may be any type of network, such as the Internet, a Wide Area Network (WAN), Local Area Network (LAN), or wireless network. In this embodiment the device 100 and the remote devices 104a, 104b, 104c could be anywhere in the world.

Although the device 100 is shown in FIG. 1 as communicating updated information, the device 100 is also capable of receiving updated information from other devices. Similarly, although the remote devices 104a, 104b, 104c are shown as receiving updated information, the remote devices 104a, 104b, 104c are also capable of communicating updated information as well.

The first embodiment shown in FIG. 1 may, for example, be used by a parent to update a child's calendar application to reflect a changed doctor's appointment. The parent could contact the child directly, but the child may be in class and unable to answer the telephone. Alternatively, the child could forget to enter the updated information into her calendar application on her cellular phone. The parent may use the present invention to automatically update the child's cellular telephone to avoid these problems.

As contemplated in the first embodiment, the parent receives notice of a rescheduled doctor's appointment. The parent then updates his own calendar application and, using the present invention, directs his device (in this example the device 100) to communicate the updated information to the child's device (in this example the remote device 104a). The remote device 104a receives the communication and updates the calendar program in the remote device 104a to reflect the changed time for the doctor's appointment. Once the remote device 104a updates its calendar application, the remote device 104a may then notify the child of the changed time for the doctor's appointment. This notification can be audible, such as a beep or ring tone; or visual, such as displaying a message on a screen of the remote device 104a.

Figure 2:
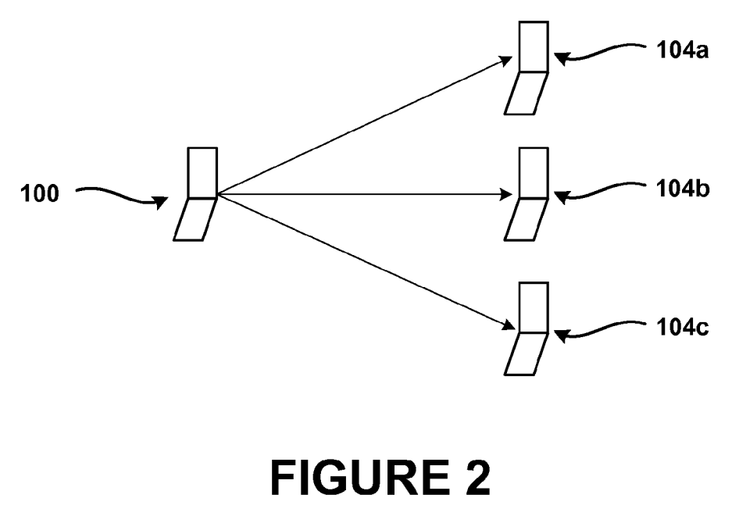
FIG. 2 shows a device according to an exemplary embodiment of the present invention communicating directly with other devices.

In a second embodiment, shown in FIG. 2, the device 100 communicates directly with the remote devices 104a, 104b, 104c. Such communication can be made using Bluetooth technology, infrared technology, WiFi, or any means suitable for communication across short distances. Although the device 100 is shown in FIG. 2 as communicating updated information, the device 100 is also capable of receiving updated information from other devices. Similarly, although the remote devices 104a, 104b, 104c are shown as receiving updated information, the remote devices 104a, 104b, 104c are also capable of communicating updated information as well.

This embodiment could be used by a professor to update all of his student's devices at once while the professor and the students are together in the classroom.

In this example, the professor announces a changed date, for example a changed essay due date. The professor then accesses his own device (in this example, the device 100) and directs the present invention to communicate the updated information to all of the students in the classroom. Instead of communicating across a network as in the first embodiment, the present invention transmits the changed essay due date directly to students' devices (in this example the remote devices 104a, 104b, 104c). In this example, the present invention may not notify students of the change, since they are already aware of the change. This omission of a notification can be accomplished by a setting present either in the professor's device (the device 100) or the student's devices (the remote devices 104a, 104b, 104c).

Further, in order to ascertain whether or not each student had actually received the notification, an automated "return receipt" is generated at the point the receiving student accessed the information. In this way, the professor can obtain a proactive account of which students did in fact receive and access the information and which did not. This insures the information has been viewed and also gives an account of a positive receipt which the professor may refer to at a later date, if necessary.

Figure 3:
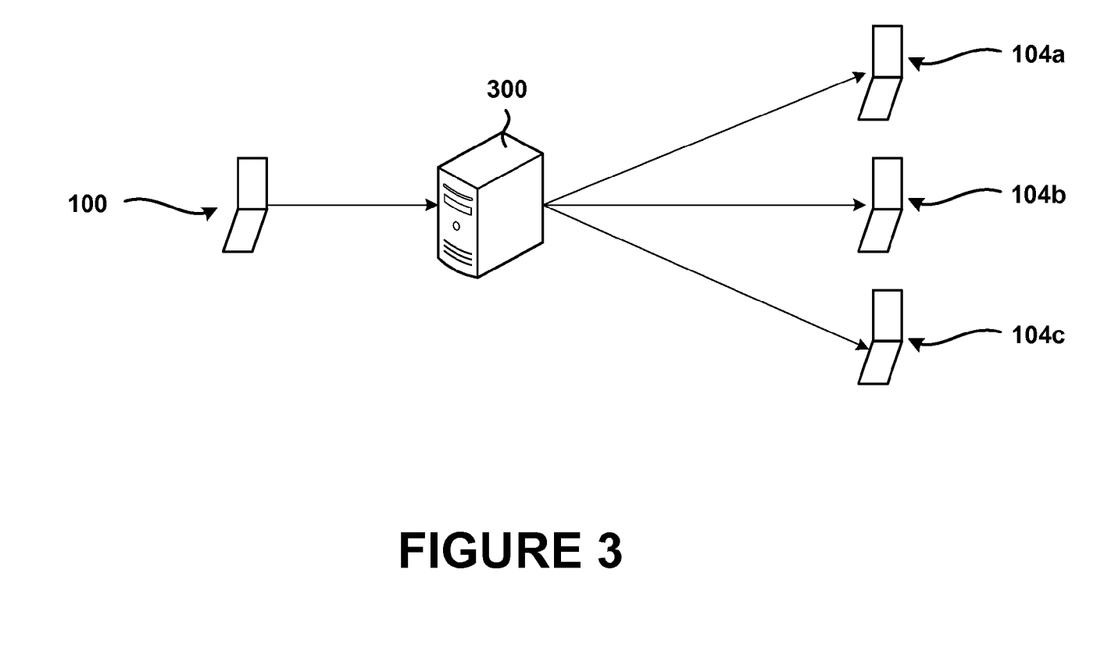
FIG. 3 shows a device according to an exemplary embodiment of the present invention communicating with other devices through a remote server.

In a third embodiment, shown in FIG. 3, the device 100 communicates changed information to a server 300. The server 300 then communicates the information to the remote devices 104a, 104b, 104c. The communication between the server 300 and the device 100 and the remote devices 104a, 104b, 104c can be by any means, such as direct communication or over a network (such as the network 102). The functionality of the server 300 can be provided by any server known in the art. Although the device 100 is shown in FIG. 3 as communicating updated information, the device 100 is also capable of receiving updated information from other devices. Similarly, although the remote devices 104a, 104b, 104c are shown as receiving updated information, the remote devices 104a, 104b, 104c are also capable of communicating updated information as well.

This embodiment may be used in situations where the number of devices involved is large or where the communication of information is controlled, such as in a large corporation. For example, an administrative assistant may need to disseminate information about a changed time for a meeting to the entire affected workforce. The assistant enters the changed time for the meeting and directs his device (in this example the device 100) to transmit the updated information to the server 300. The assistant also selects a set (or subset) of devices (in this example, a set or subset of the remote devices 104a, 104b, 104c) to receive the changed message.

In one scenario, the meeting might be for an entire marketing department. In such a scenario, the secretary selects the marketing department as the set or subset of devices (in this example, the remote devices 104a, 104b) to which to transmit the changed information. When the server 300 receives the changed information and the set or subset of devices, the server 300 determines which devices to transmit the changed information to and transmits the changed information to the selected devices. Thus, the server 300 may transmit the changed information to the remote devices 104a, 104b, since the users of those devices are in the marketing department, but may not transmit the changed information to the remote device 104c, since the user of remote device 104c is an engineer (and is not in the marketing department).

While the above example embodiments described updating an existing event in the remote devices 104a, 104b, 104c, the present invention may also be used to disseminate new information from the device 100 to the remote devices 104a, 104b, 104c. Using the example of the professor above, the professor may choose to add a new assignment. The professor may then add the new assignment due date to his device (in this example the device 100) and instruct the present invention to communicate the new assignment due date to the students' devices (in this example, the remote devices 104a, 104b, 104c).

Similarly, the present invention may be used to delete an event on the remote devices 104a, 104b, 104c. Using the example of the administrative assistant, the assistant may need to disseminate news of a cancelled meeting to members of the marketing department. The secretary deletes the event from his device (in this example the device 100) and directs the present invention to communicate the cancellation to marketing department members' devices (in this example the remote devices 104a, 104b). Upon receiving the information, the remote devices 104a, 104b delete the event corresponding to the cancelled marketing meeting and notify the respective users.

Figure 4A:
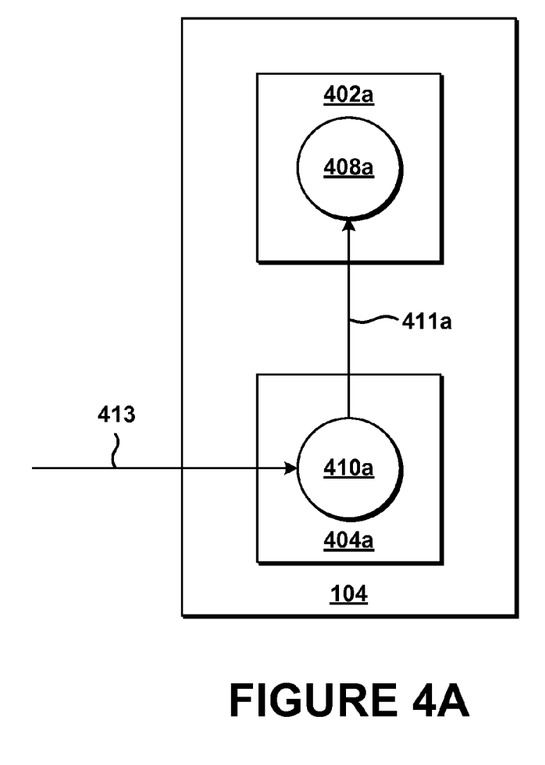
FIG. 4A shows an expanded view of a device with personal information management and update components according to an exemplary embodiment of the present invention.

In a fourth exemplary embodiment, FIG. 4A shows a diagram of a remote device 104 (which can correspond, for example, to one of the remote devices 104a, 104b, 104c). The remote device 104 includes a personal information management component 402a and an update component 404a. The personal information management component 402a stores object(s) 408a including information useful to the user of the remote device 104. If the personal information management component 402a is a calendar application, the object 408a may be an event, such as the doctor's appointment, assignment due date, or marketing meeting described in the above examples.

The remote device 104 also includes an update component 404a. The update component 404a receives updated object(s) 410a from other devices (such as the device 100) via a communication 413. The update component 404a determines which object 408a stored in the personal information management component 402a corresponds to the updated object 410a. The update component 404a could also determine that no corresponding object exists.

The information in the updated object 410a determines what action the update component 404a will take once it locates the object 408a corresponding to the updated object 410a. If the updated object 410a contains information different from that in the object 408a, the update component 404a updates the object 408a to reflect the changed information as depicted by the communication 411a. The updated object 410a may, however, indicate that the information in the object 408a is no longer needed. In this case, the update component 404a deletes the object 408a. This may occur in the example of the cancelled marketing meeting given above.

The update component 404a may not be able to locate an object 408a corresponding to the updated object 410a. In this situation, the update component 404a could do one of several things. The update component 404a could treat the updated object 410a as new information and create a new object 408a corresponding to the updated object 410a. The update component 404a could also ignore the updated object 410a. The update component 404a could also notify the user and permit the user to determine how to treat the updated object 410a.

The update component 404a may contain additional functionality as well, such as security features. In a fourth embodiment, the update component 404a receives an authentication code along with the updated object 410a. For example, the authentication code could be a unique identifier corresponding to the remote device 104, which the user can give out to others whom the user wishes to receive updated information from. The authentication code could also identify the remote user transmitting the updated object 410a. These, however, are merely exemplary forms of an authentication code. The authentication code could be any form of identifying information.

The update component 404a then uses the authentication code to confirm that the updated object 410a is genuine and originates from a known or acceptable remote user. Use of an authentication code would prevent malicious users from placing false information into the personal information management component 402a.

The personal information management component 402a and the update component 404a are shown in FIG. 4A as being separate entities. It should be understood, however, that this is not a requirement of the present invention. The update component 404a may be a sub-component of the personal information management component 402a or vice versa.

Figure 4B:
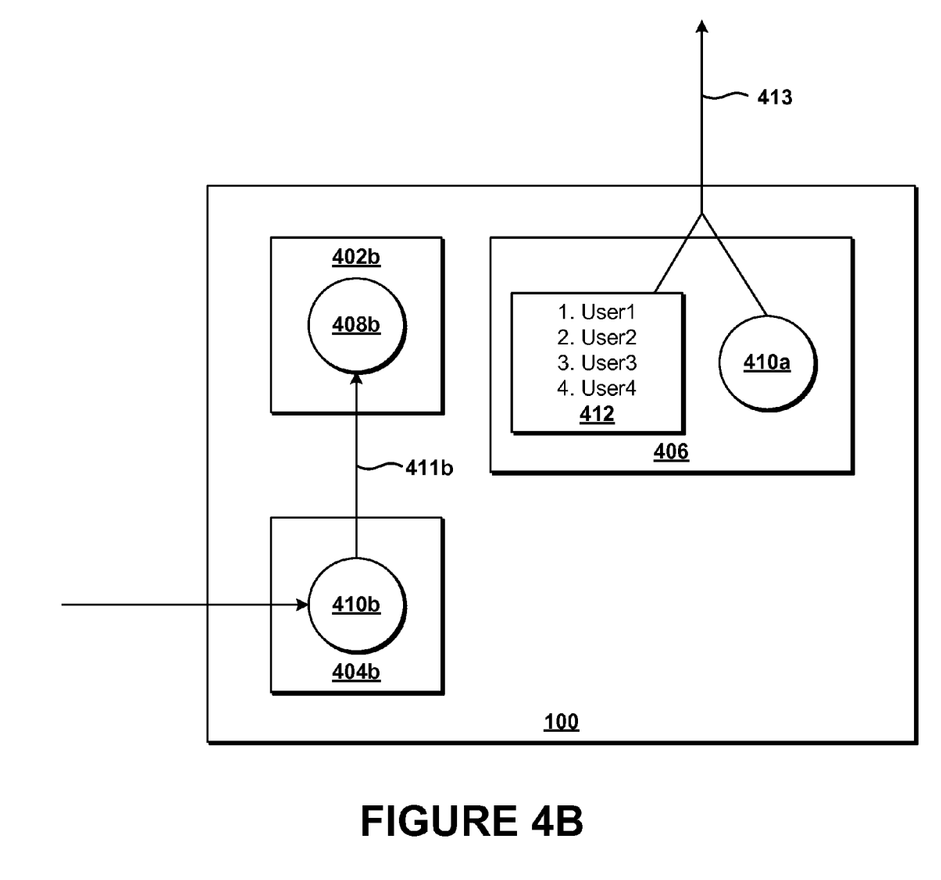
FIG. 4B shows an expanded view of a device with personal information management, update, and transmission components according to an exemplary embodiment of the present invention.

FIG. 4B shows a fifth exemplary embodiment of the present invention. Similar to the remote device 104, the device 100 includes a personal information management component 402b and an update component 404b. These components perform the same function for device 100 as the similarly numbered components (the personal information management component 402a and the update component 404a) perform for the remote device 104. The device 100 also includes a transmission component 406. The transmission component 406 transmits the updated object 410a via a transmission 413 to remote devices 104a, 104b, 104c. The transmission 413 may be used to transmit the updated object 410a via any of the mechanisms shown in FIGS. 1-3.

The transmission component 406 may also contain a set 412 of receiving users of remote devices 104a, 104b, 104c to whom the transmitting user of the device 100 may wish to transmit the updated objects 410a. The set 412 may contain the names of such users as well as information needed to transmit updated information to those users. Subsets of users in the set 412 may also be given identifiers, such as "Marketing Department" or "Computer Science 101" to permit easy transmission of the updated object 410a to a larger group of users. If an authentication code is required, as contemplated in the fourth embodiment described above, the set 412 may also contain the necessary authentication codes.

The information stored in the set 412 may also be contained in, mirrored by, or copied to the server 300. In this way, no matter what the chosen device for transmission or receipt of data, a "network" version of the information is made available to the user of the system. This provides for a single user to access many different devices for the same information (although it may be displayed in different formats) and provides for an automated "back-up" facility for information residing on the device 100 and the remote devices 104a, 104b, 104c.

In operation, a user creates an updated object 410a and selects one or more users from the set 412 to whom to transmit updated object 410a. The technique of selecting users from the set 412 can be done via techniques known in the art. For example, the transmitting user could select receiving users from a list of users in the set 412. Alternatively, in a graphical user interface, the transmitting user could "drag" a representation of the updated object 410a and "drop" the representation onto icons representing users in the set 412.

Once the transmitting user of the device 100 selects the updated object 410a and a subset (which may be only one) of receiving users from the set 412, the transmission component 406 transmits the updated object 410a to the selected devices (in this example one or more of the remote devices 104a, 104b, 104c) corresponding to the receiving users. If an authentication code is required, as contemplated in the fourth embodiment above, the transmission component 406 will also transmit the authentication code.

The personal information management component 402b, the update component 404b, and the transmission component 406 are shown in FIG. 4B as being separate entities. It should be understood, however, that the personal information management component 402b, the update component 404b, and the transmission component 406 do not have to be separate components. The update component 404b and the transmission component 406 may be subcomponents of the personal information management component 402b or vice versa. The personal information management components 402a and 402b, the update components 404a and 404b, and the transmission component 406 are preferably software programs stored in a computer-readable medium at the remote device 104 and the device 100. Similarly, the objects 408a and 408b and the updated objects 410a and 410b are data structures stored in a computer readable medium at the remote device 104 and device 100, respectively.

Figure 5:
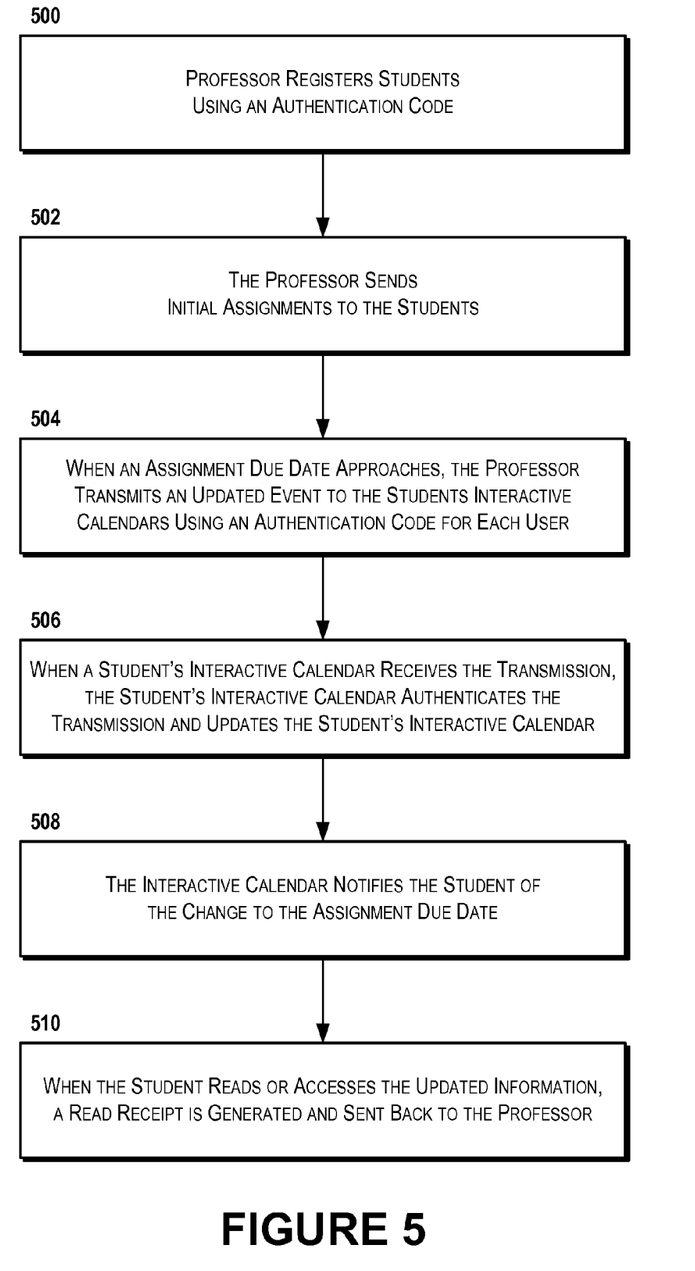
FIG. 5 shows an exemplary method of operating the present invention, using an example of a professor transmitting a new assignment due date to students.

FIG. 5 describes a method of using the present invention corresponding to the example of the professor given above with respect to FIG. 2. At the beginning of the semester, in step 500, the professor obtains an authentication code for each of his students and enters the authentication code into the transmitting device (in this example the device 100), along with the names of the students and their identifying information. For example, if the receiving devices (in this example the remote devices 104a, 104b, 104c) are the students' cellular telephones, the identifying information may be the telephone numbers of the remote devices 104a, 104b, 104c.

Once the professor has entered the necessary information into his transmitting device (in this example the device 100), the professor transmits assignments to the students in step 502. This transmission may be done either through the present invention or directly communicating the assignment to the class (such as through a printed handout or an announcement.)

Later in the semester, the assignment's original due date may change. The change could be for any reason, such as an unexpected cancellation of classes. In step 504, the professor prepares an updated object 410a reflecting the changed due date. The professor selects a subset of a set 412 of users, where the set 412 corresponds to the students in his class. The transmission component 406 then transmits the updated object 410a to the students, along with an authentication code.

A student's device (in this example the remote device 104a) receives the updated object 410a and the authentication code in step 506. The update component 404a authenticates the updated object 410a. Once the updated object 410a is updated, the update component 404a searches the personal information management component 402a for a corresponding object 408a containing the original assignment due date. Once the object 408a is found, the update component 404a updates the object 408a with the information in the updated object 410a, namely the new assignment due date. This replacement may be by any means known in the art. For example, the update component could change the original assignment due date in the object 408a to be the new assignment due date in the updated object 410a. The update component 404 could also simply replace the object 408a with the updated object 410a.

In step 508, the remote device 104a notifies the student of the changed due date. This notification could be by any technique known in the art, such as an audio alert (a beep) or a message displayed on a screen of the remote device 104a. The user of the remote device 104a (the student) may also be able to change the mode of notification by way of a preferences setting. When the student reads or accesses the updated information in step 510, a return receipt component transmits a read receipt to the professor, informing the professor that the student has received the updated information. The return receipt component could be a separate component or part of the update component, personal information management component, or transmission component.

The method of FIG. 5 may also be used to transmit a new object or to delete an existing object. For example, the professor could use the present invention for multiple purposes. The steps would remain largely the same, except that the updated object 410a would consist either of new information (the original assignment due date) or a direction to delete an existing object 408a. In step 506, instead of updating the object 408a, the update component 404a would create a new object 408a or delete an existing object 408a, as needed. Many other uses are also possible and are within the scope of the present invention.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. A cellular telephone comprising:
a personal information management component comprising an interactive calendar that stores an event object; and
an update component in communication with the personal information management component, wherein the update component performs operations comprising
sending, to a remote cellular device, an authentication code comprising a telephone number associated with the cellular telephone and information that is different from further information included in the event object to register the cellular telephone to receive events and event updates from the remote cellular device,
receiving, from the remote cellular device via a communications network, the event object,
storing the event object in the interactive calendar,
receiving, from the remote cellular device via the communications network, an updated object comprising the authentication code and indicating that a date associated with an event represented by the event object has changed, authenticating a remote user associated with the remote cellular device using the authentication code to determine that the updated object originates from a known remote user with which the cellular telephone has registered to receive the events and the event updates, identifying the event object in the interactive calendar based upon the updated object, updating the event object using the information included in the updated object, generating a notification comprising a message that indicates that the event object has been updated, displaying the notification on a screen of the cellular telephone to inform a user of the cellular telephone that the event object has been updated by the updated object, the notification indicating that the date associated with the event has changed, determining that the notification has been viewed at the cellular telephone, generating a return receipt that indicates that the updated object has been received and viewed at the cellular telephone, and transmitting, via the communications network, the return receipt to the remote cellular device.

2. The cellular telephone of claim 1, wherein the updated object comprises a cancellation that deletes the event object.

3. The cellular telephone of claim 1, wherein the updated object comprises a cancellation that deletes the event object, and wherein the update component receives the cancellation directly from the remote cellular device.

4. The cellular telephone of claim 3, wherein the update component receives the cancellation from the remote cellular device via a WiFi communication.

5. The cellular telephone of claim 1, wherein the updated object comprises a cancellation that deletes the event object.

6. The cellular telephone of claim 5, wherein the update component receives the cancellation from the remote cellular device via a network.

7. The cellular telephone of claim 5, wherein the update component receives the cancellation from the remote cellular device via a network that comprises a remote server.

8. The cellular telephone of claim 1, wherein the update component performs operations further comprising:

receiving a new event object including information about a further event;

updating the personal information management component by adding the new event object to the interactive calendar; and displaying a further notification indicating receipt of the new event object on the screen of the cellular telephone.

9. The cellular telephone of claim 1, wherein the communications network comprises a cellular communications network.

10. A cellular telephone comprising:

a personal information management component comprising an interactive calendar that stores a plurality of event objects; and an update component in communication with the personal information management component, wherein the update component performs operations comprising sending, to a remote cellular device, an authentication code comprising a telephone number associated with the cellular telephone to register the cellular telephone to receive events and event updates from the remote cellular device, receiving, from the remote cellular device via a cellular communications network, a first event object corresponding to a first event and a second event object corresponding to a second event, storing the first event object and the second event object in the interactive calendar, receiving, from the remote cellular device via the cellular communications network, a first cancellation for the first event object, the first cancellation comprising the authentication code and corresponding to a cancellation of the first event corresponding to the first event object, authenticating a remote user associated with the remote cellular device using the authentication code to determine that the first cancellation originates from a known remote user with which the cellular telephone has registered to receive the events and the event updates, identifying the first event object in the interactive calendar based upon the first cancellation, cancelling the first event object by deleting the first event object from the interactive calendar, generating a notification comprising a message that the first event has been cancelled, displaying the notification on a screen of the cellular telephone to inform a user of the cellular telephone that the first event has been deleted, determining that the notification has been viewed at the cellular telephone, generating a return receipt that indicates that the notification has been viewed at the cellular telephone, transmitting, by a return receipt component of the cellular telephone, the return receipt to the remote cellular device to indicate that the cancellation for the first event object has been received and viewed at the cellular telephone, and receiving, via a network, a second cancellation for the second event object.

11. The cellular telephone of claim 10, wherein the second cancellation is received via a remote server of the network.

12. The cellular telephone of claim 10, wherein the second cancellation is received with another authentication code.

13. A method comprising:

sending to a remote cellular device, by a cellular telephone comprising a personal information management component comprising an interactive calendar, an authentication code comprising a telephone number associated with the cellular telephone to register the cellular telephone to receive events and event updates from the remote cellular device;

receiving, from the remote cellular device via a cellular communications network, a plurality of event objects;

storing, at the cellular telephone, the plurality of event objects in the interactive calendar;

receiving, at an update component of the cellular telephone via the cellular communications network, an update for a corresponding event object of the plurality of event objects, the update comprising the authentication code and indicating that a date associated with an event represented by the event object has changed, the update being received from the remote cellular device;

authenticating, by the cellular telephone, a remote user associated with the remote cellular device to determine that the update originates from a known remote user with which the cellular telephone has registered to receive the events and the event updates;

updating, by the cellular telephone, the corresponding event object based upon the update;

generating, by the cellular telephone, a notification comprising a message that the corresponding event object has been updated at the cellular telephone;

displaying, by the cellular telephone, the notification on a screen of the cellular telephone to inform a user of the cellular telephone that the corresponding event object has been updated, the notification indicating that the date associated with the event has changed;

determining, by the cellular telephone, that the notification has been viewed at the cellular telephone;

generating, by the cellular telephone, a return receipt that indicates that the notification has been received and viewed at the cellular telephone; and transmitting, by the cellular telephone via the cellular communications network, the return receipt to the remote cellular device to indicate that the update has been received by the cellular telephone, viewed at the cellular telephone, and that the cellular telephone has updated the interactive calendar at the cellular telephone based on the update.

14. The method of claim 13, further comprising:

receiving a new event object including information about a further event;

updating the personal information management component by adding the new event object to the interactive calendar; and displaying a further notification indicating receipt of the new event object on the screen of the cellular telephone.

15. The method of claim 13, wherein the update comprises a cancellation that deletes the event object.

16. The method of claim 13, wherein the update comprises a cancellation that deletes the event object, and wherein the update component receives the cancellation directly from the remote cellular device.

17. The method of claim 15, wherein the update component receives the cancellation from the remote cellular device via a WiFi communication.

18. The method of claim 13, wherein the update comprises a cancellation.

19. The method of claim 15, wherein the update component receives the cancellation from the remote cellular device via a network.

20. The method of claim 15, wherein the update component receives the cancellation from the remote cellular device via a network that comprises a remote server.

* * * * *